INVENTOR
WILLIAM R. LONG
ATTORNEYS

Sept. 20, 1971  W. R. LONG  3,606,048
VEHICLE HAVING FRONT, CENTRAL AND REAR IMPLEMENTS
Filed Sept. 5, 1969  6 Sheets-Sheet 2

INVENTOR
WILLIAM R. LONG

BY
ATTORNEYS

Sept. 20, 1971   W. R. LONG   3,606,048
VEHICLE HAVING FRONT, CENTRAL AND REAR IMPLEMENTS
Filed Sept. 5, 1969   6 Sheets-Sheet 3

INVENTOR
WILLIAM R. LONG

BY
ATTORNEYS

INVENTOR
WILLIAM R. LONG

Sept. 20, 1971 W. R. LONG 3,606,048
VEHICLE HAVING FRONT, CENTRAL AND REAR IMPLEMENTS
Filed Sept. 5, 1969 6 Sheets-Sheet 5

INVENTOR
WILLIAM R. LONG

BY
ATTORNEYS

United States Patent Office 3,606,048
Patented Sept. 20, 1971

3,606,048
VEHICLE HAVING FRONT, CENTRAL AND REAR IMPLEMENTS
William R. Long, Tarboro, N.C., assignor to Long Manufacturing Company, Tarboro, N.C.
Filed Sept. 5, 1969, Ser. No. 855,646
Int. Cl. B66f 9/00
U.S. Cl. 214—138   6 Claims

ABSTRACT OF THE DISCLOSURE

A land vehicle having implements mounted at the front, central and rear portions and in which certain of said implements are replaceable by other implements and such implements are arranged so that each implement can be operated independently or two or more of the implements can be operated simultaneously.

BACKGROUND OF THE INVENTION

(1) Field of the invention

This invention relates generally to land vehicles of various kinds and relates particularly to a vehicle having a first implement mounted at the front, a second implement mounted intermediate the length of the vehicle, and a third implement mounted at the rear with such implements adapted to be used for loading, unloading, raising and lowering, as well as digging into the earth to provide a hole, ditch or the like.

(2) Description of the prior art

Heretofore many vehicles having various devices mounted thereon have been provided for loading and unloading matter, for raising and lowering various objects, and for penetrating the earth to dig a hole or ditch. However, in most instances each of these devices has been mounted on a separate vehicle. Some efforts have been made to mount a pair of implements on a vehicle, one at the front and one at the rear, to better utilize the vehicle. These prior devices have not been entirely satisfactory since vehicles having a single implement mounted thereon in many instances have not been financially feasible since the amount of work that each implement is capable of doing has been limited and, therefore, the vehicle has been idle a substantial amount of the time while waiting for the opportunity to perform the work for which it was intended. In some cases where a pair of implements were mounted on the vehicle, the useful time of the vehicle has been increased; however, much work has been necessary during the time the vehicle was idle since the work could not be performed by the implements mounted on the vehicle.

In the construction of buildings of various kinds, such as houses, barns and the like, it is necessary to excavate certain area of earth for basements and foundations and dig ditches for supplying water and sewage lines to the building. Also it is necessary to move large quantities of earth either from one place to another, or remove the earth from the area altogether as well as backfill the ditches and excavations after the pipes have been laid and the foundation has been raised and grade the surrounding terrain of the building. In addition, it has been necessary to lift and transfer relatively heavy objects such as storage tanks and the like, as well as to raise and support relatively heavy beams and roof trusses at a substantial elevation above the ground. Usually these operations have been performed by separate vehicles and the cost of such vehicles which have been idle a substantial amount of the time has been reflected in the over-all cost of construction.

SUMMARY OF THE INVENTION

The present invention is a land vehicle having a first implement, such as a front end loader or the like, mounted on a pair of lift arms at the front of the vehicle, and preferably such implement is interchangeable with other implements, such as a scraper blade, fork lift, or the like.

Intermediate the ends of the vehicle a crane is provided having a telescopic boom which can be used for raising and lowering relatively heavy objects to a substantially higher elevation, as well as for moving such objects from place to place, or for lowering the objects into an opening in the ground. The crane is raised and lowered by fluid pressure and can be swung from side to side as required.

At the rear of the vehicle an implement such as a backhoe or the like is provided having a boom mounted about vertical and horizontal pivots which permit the boom to be swung from side to side as well as to be raised and lowered, and such boom is connected to a dip stick having a bucket mounted thereon which can be operated to penetrate the earth to dig a hole, ditch or the like.

It is an object of the invention to provide a land vehicle having a first implement mounted on the front thereof, a second implement mounted intermediate its length, and a third implement mounted on the rear of the vehicle with each of the implements adapted to perform a separate function so that the versatility of the vehicle will be increased and a single vehicle can be used to perform multiple functions simultaneously or sequentially.

DESCRIPTION OF THE PREFERRED EMBODIMENT

Figure 5:
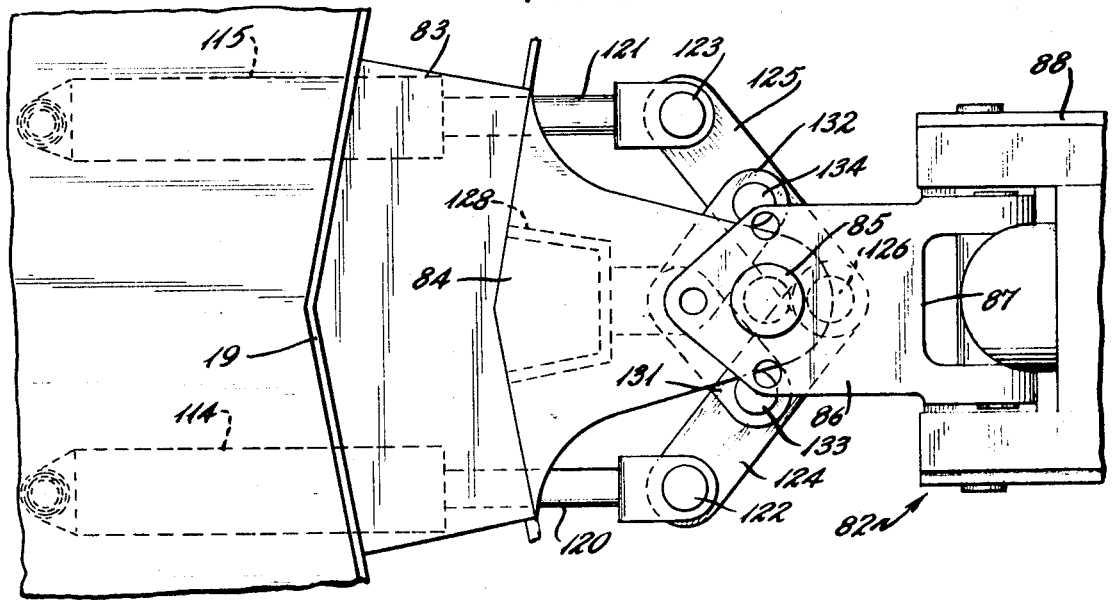
FIG. 5 is an enlarged fragmentary top plan view of the apparatus for rotating the rear implement.
Figure 6:
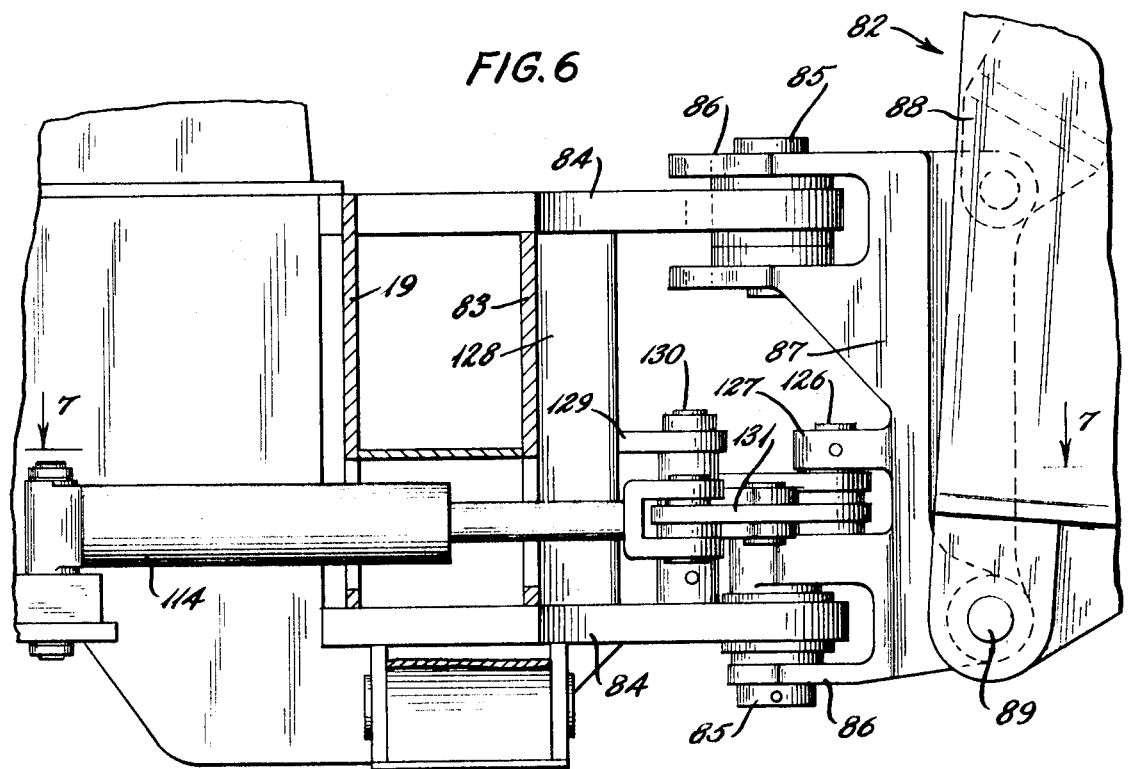
FIG. 6 is a side elevation thereof.
Figure 7:
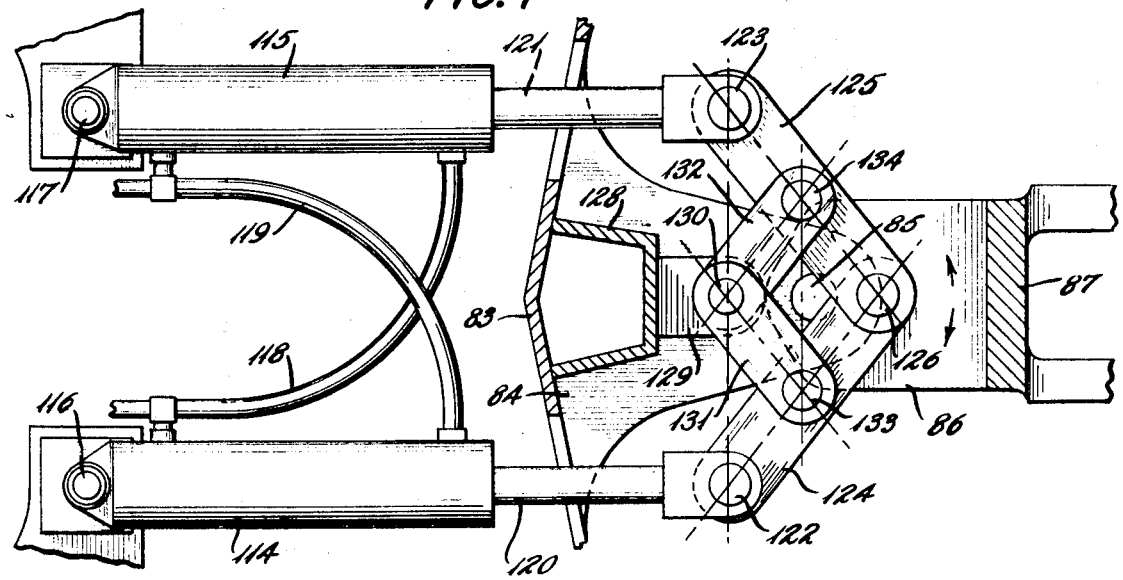
FIG. 7 is a section on the line 7—7 of FIG. 6 illustrating the backhoe unit in one position.

With continued reference to the drawings, a vehicle 10 is provided having front and rear wheels 11 and 12 which support a frame 13 on which a power plant 14 is mounted. A swivel seat 15 is provided for the operator and such seat is rotatably mounted on a post 16 so that the operator can rotate a full 360°. A steering wheel 17 is provided for controlling the front wheels 11 and such steering wheel may be mounted on a fixed steering column or if desired could be mounted on a tilting column that could be locked in any desired position. The frame 13 extends substantially the full length of the vehicle and includes a pair of side members 18 connected by a rear member 19 (FIGS. 5 and 6) and a front member (not shown) to form a box frame. Intermediate the ends of the frame a bridge 20 is provided having generally upstanding side members 21 connected at their upper ends by a cross member 22. The bridge 20 preferably is welded or otherwise permanently attached to the frame 13 to form a solid unitary construction.

At the front of the vehicle 10 a first implement such as a loader 25 is provided including a pair of generally parallel angularly disposed arms 26 mounted on pivots 27 carried by the side members 21 of the bridge with a spacer 28 disposed between the bridge and each of the arms. The arms 26 are relatively thick in order to impart the necessary strength and rigidity and in order to raise and lower such arms, a pair of anchor plates 29 are welded or otherwise attached to both sides of each arm intermediate the length thereof and such anchor plates project above and below the arms. Below each of the arms 26, the anchor plates 29 are connected by a pin 30 to which is swingably connected one end of a piston rod 31 carried by a fluid cylinder 32 and such cylinder is swingably mounted on a pin 33 fixed to the frame 13. Fluid under pressure is introduced into the cylinder 32 through a fluid line 34 from the fluid system of the vehicle. When the piston rod 31 is extended, one end of the arms 26 will swing about the pivots 27 so that the opposite ends of the arms 26 will be raised and lowered relative to the earth.

Figure 1:
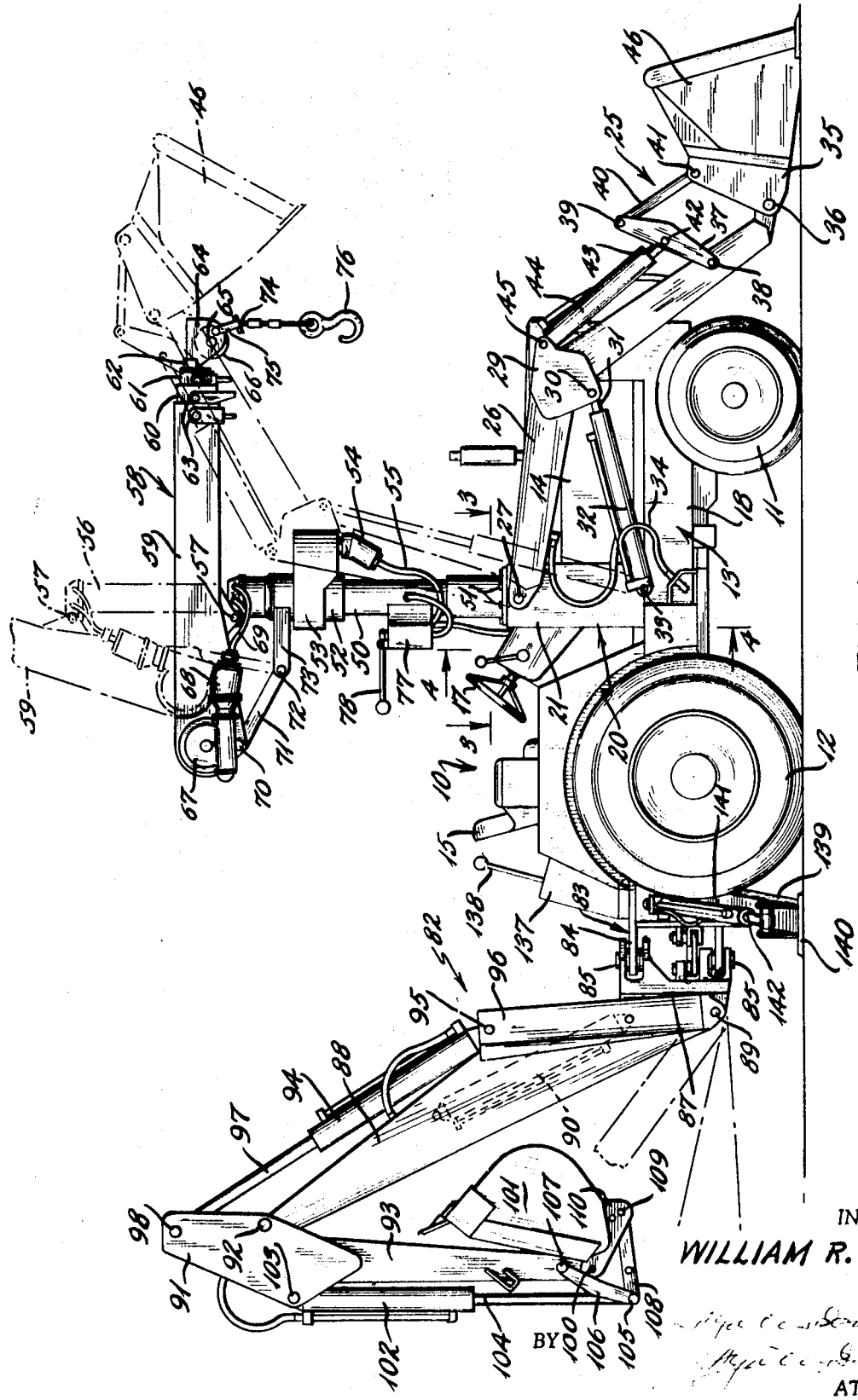
FIG. 1 is a side elevation illustrating one application of the invention.
Figure 2:
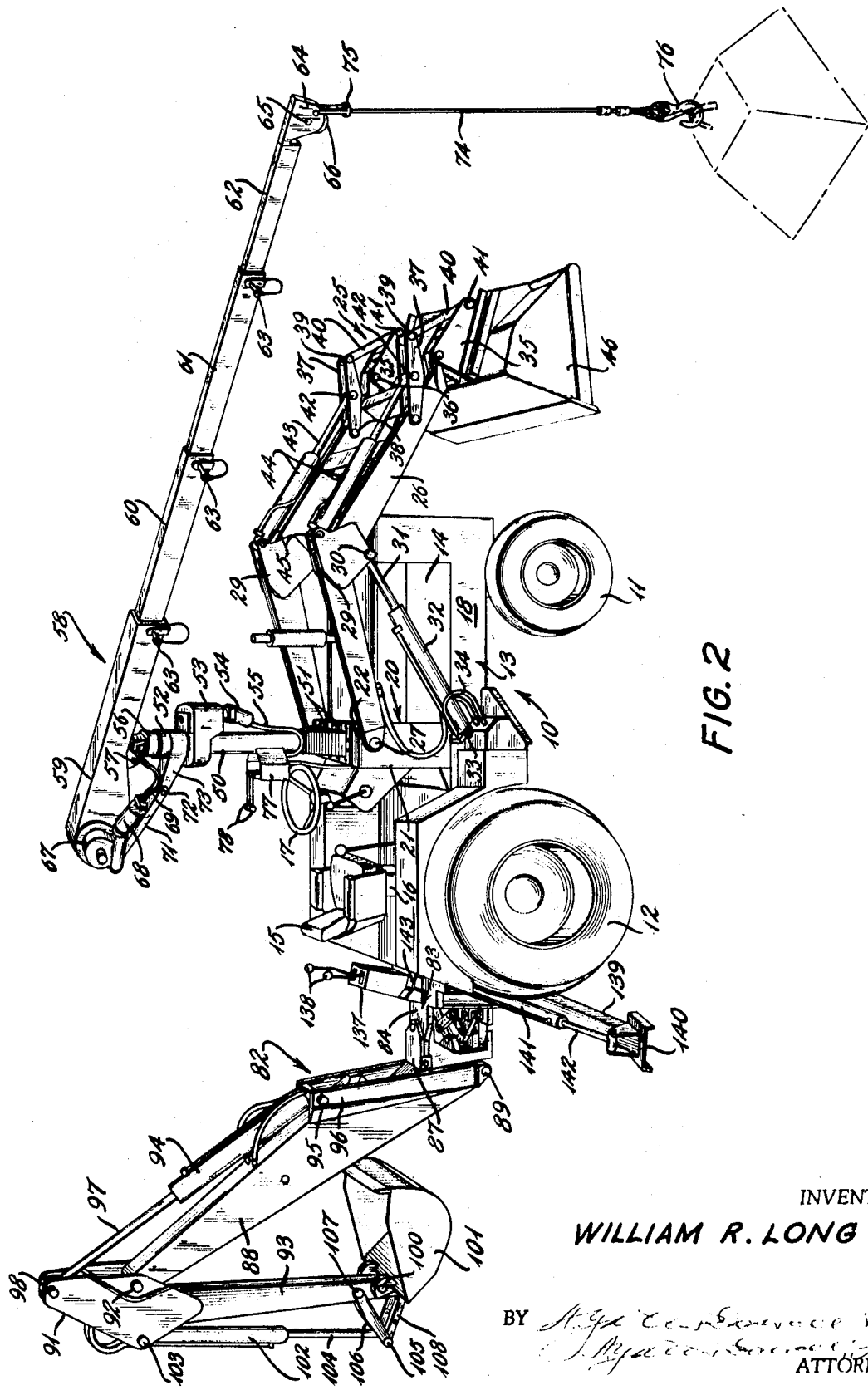
FIG. 2 is a perspective thereof.
Figure 3:
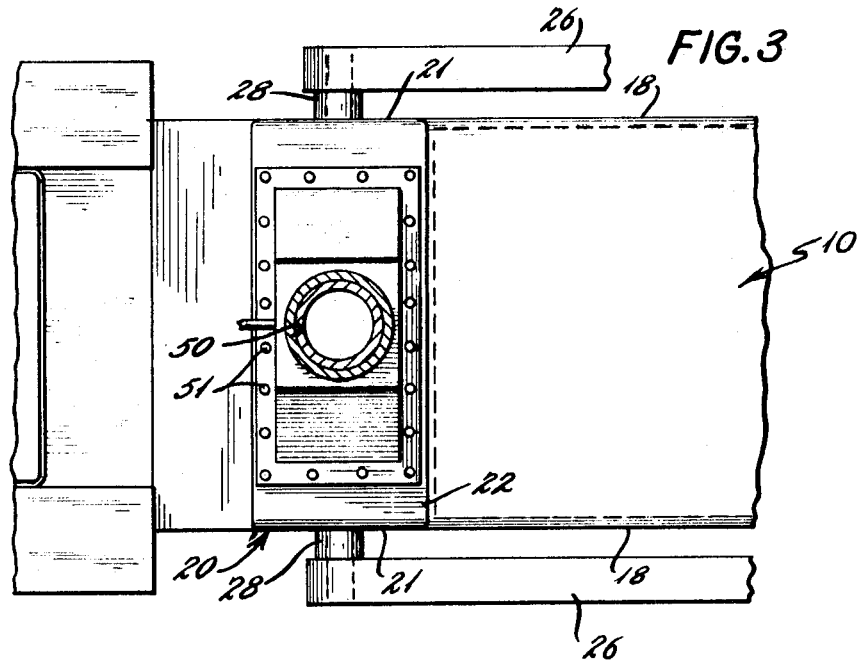
FIG. 3 is an enlarged section on the line 3—3 of FIG. 1.
Figure 4:
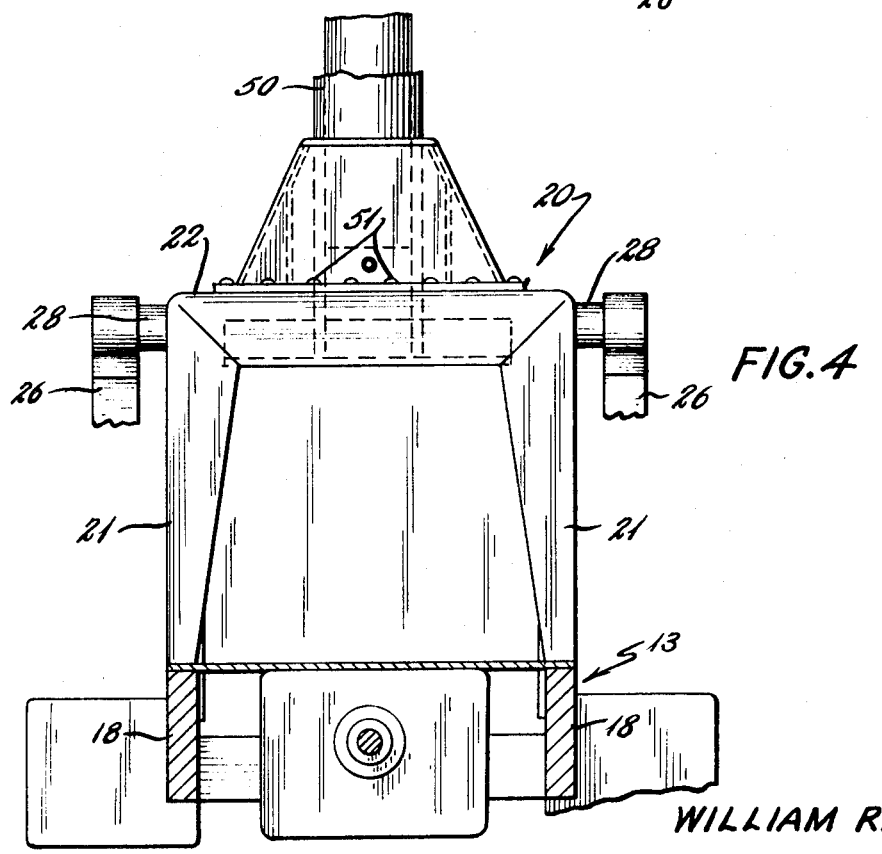
FIG. 4 is an enlarged section on the line 4—4 of FIG. 1.

At the outer free ends of each of the arms 26, a mounting frame 35 is swingably connected by a pivot 36 at its lower portion to the outer end of each of the arms 26. As illustrated in FIGS. 1 and 2, an operating lever 37 is swingably mounted by a pin 38 to each of the arms 26 adjacent the outer end thereof. The opposite end of each operating lever is connected by a pin 39 to one end of a link 40. The opposite end of the link 40 is connected by a pivot pin 41 to the upper portion of the mounting frame 35. In order to control the position of the mounting frame, each operating lever 37 has a pivot pin 42 intermediate its length and such pivot pin is adapted to receive one end of a piston rod 43 carried by a fluid cylinder 44. The end of the fluid cylinder 44 is swingably mounted on a pin 45 carried by the anchor plates 29. The extending and retracting of the piston rod 43 causes the mounting frame 35 to swing about the pivot 36. As illustrated in FIGS. 1 and 2, the loader 25 may include an elongated bucket 46 which is connected to the mounting frame 35 in any desired manner. However, a quick connecting and disconnecting means is preferred so that the bucket 46 can be interchangeable with another implement such as a fork lift or a jib crane adapted to be connected to the mounting frame.

At the top of the bridge 20 a generally upright relatively large fluid cylinder 50 is mounted in any desired manner, as by fasteners 51. A sleeve 52 is rotatably mounted adjacent to the upper end of the fluid cylinder 50 and such sleeve supports a housing 53 which encloses a drive mechanism such as a worm and worm gear (not shown) which controls the position of the sleeve 52 relative to the cylinder 50. The drive mechanism can be operated in any desired manner although for the purposes of illustration a reversible fluid motor 54 connected to the fluid system of the vehicle by fluid lines 55 is disclosed. Operation of the fluid motor in one direction will cause the sleeve and housing to rotate about the cylinder 50 in one direction, and operation of the fluid motor in the opposite direction will cause the sleeve and housing to rotate in the opposite direction.

The fluid cylinder 50 has a piston rod 56 the upper end of which is connected by a pivot 57 to a telescoping boom 58. The telescoping boom 58 includes a base portion 59, a first intermediate portion 60, a second intermediate portion 61, and an outer end portion 62. Each of the base portion 59 and first and second intermediate portions 60 and 61 includes a lock pin 63 adapted to extend through opposite sides thereof and through the inner end of a cooperating telescoping portion so that the boom 58 can be locked in extended position, as illustrated in FIG. 2, or the pins can be removed so that the outer end portion and the first and second intermediate portions can be telescopically received within the base portion 59, as illustrated in FIG. 1. Preferably the outer end portion 62 has a pair of spaced generally parallel ears or lugs 64 connected by a pivot pin or stub shaft 65 on which a sheave or pulley 66 is rotatably mounted. At the opposite end of the base portion 59 a winch (not shown) is driven by gearing 67 operated by a reversible fluid motor 68 connected by fluid lines 69 to the hydraulic system of the vehicle.

In order to permit elevation of the telescoping boom 58, the end of the base portion 59 adjacent to the gearing 67 is connected by a pin 70 to a connecting link 71 the opposite end of which is swingably connected by a pin 72 to a fixed extension 73 carried by the sleeve 52. A cable 74 is wound about the winch drum and extends through the telescoping boom 58 and around the pulley 66, through a guide or fair lead 75 and is connected at its outer end to a hook 76.

The telescoping boom may be of any desired length although a length of approximately six feet in closed position and 13½ feet fully extended has proved satisfactory. In the closed position the boom can lift approximately 2400 pounds to a height of substantially ten feet and in the fully extended position the boom can lift approximately 1300 pounds to a height of substantially 21 feet. Although a telescoping boom has been illustrated and described, it is contemplated that a boom of any desired fixed length could be mounted on the fluid cylinder 50. As illustrated a selector valve 77 is mounted on the fluid cylinder 50 in a position readily accessible to the operator of the vehicle and such valve includes operating levers 78 for controlling the lateral position and elevation of the boom as well as the operation of the fluid motor 68.

At the rear of the vehicle 10 an implement such as a backhoe 82 is mounted and such backhoe includes a vertically disposed generally C-shaped support member 83 fixed to the rear member 19 of the vehicle frame 13 and having rearwardly extending generally parallel arms 84. Each of the arms 84 is connected by a pintle 85 to spaced bifurcated lugs 86 of a base member 87. The boom 88 is swingably connected by a pin 89 to the base member 87 and such boom is adapted to be raised and lowered about the pivot pin 89 by a fluid cylinder 90 connected to the fluid system of the vehicle. At the outer end of the backhoe boom 88 a pair of spaced anchor plates 91 are pivotally mounted by the pin 92 to opposite sides of the boom, and such anchor plates are welded or otherwise attached to one end of a dip stick 93. In order to control the position of the dip stick relative to the boom 88, a fluid cylinder 94 is provided having one end swingably mounted by a pin 95 to a pair of spaced lugs 96 carried by the boom 88. The cylinder 94 includes a piston rod 97 the outer end of which is swingably connected to a pin 98 carried by the anchor plates 91 in such a manner that extension and retraction of the piston rod will cause the dip stick 93 to pivot about the pin 92.

The outer free end of the dip stick 93 is connected by a pin 100 to a scoop or bucket 101. In order to control the position of the bucket 101 relative to the dip stick 93, a fluid cylinder 102 is connected at one end to the anchor plates 91 by a pin 103, and such cylinder has an extendable and retractable piston rod 104 having its free end pivotally connected by a pin 105 to one end of a lever 106. The opposite end of the lever is pivotally connected by a pin 107 to the outer end of the dip stick 93. A connecting link 108 has one end portion swingably connected to the pin 105 and the opposite end swingably connected to a pin 109 carried by lugs 110 on the bucket 101. Extension and retraction of the piston rod 104 will pivot the lever 106 about the pin 107 so that the connecting link 108 will pivot the bucket 101 about the pin 100.

With reference to FIGS. 5-8, in order to rotate the backhoe 82 through a smooth arc of at least 90° to each side of the longitudinal center line of the vehicle, the pintles 85 (FIG. 6) are directly above and below each other in a vertical plane. A pair of spaced generally parallel fluid cylinders 114 and 115 are mounted by pins 116 and 117 respectively to the frame of the vehicle, and such cylinders are supplied with fluid under pressure from the fluid system of the vehicle through fluid lines 118 and 119.

The cylinders 114 and 115 have piston rods 120 and 121 respectively and such piston rods are connected by pins 122 and 123 to links 124 and 125 respectively. The opposite ends of the links 124 and 125 are swingably connected to a common pivot 126 carried by a lug 127 and the lower bifurcated lugs 86 of the base member 87. When the backhoe 82 is disposed along the longitudinal axis of the vehicle, the vertical axis of pivot 126 will be spaced rearwardly from and generally parallel to the vertical axis of the pintles 85.

The support member 83 has a rearwardly extending enlargement 128 with a pair of vertically spaced generally parallel lugs 129 extending rearwardly therefrom, and such lugs 129 are connected by a pivot pin 130 having its longitudinal axis in a generally vertical plane. When the backhoe 82 is disposed along the longitudinal axis of the vehicle, the pivot pin 130 will be spaced forwardly of and generally parallel to the vertical axis of the pivot 126 and the vertical axes of the pintles 85. A pair of connecting links 131 and 132 are swingably mounted at one end on the pivot pin 130 and the opposite ends of such connecting links are swingably attached by pins 133 and 134 to the links 124 and 125 respectively.

Figure 8:
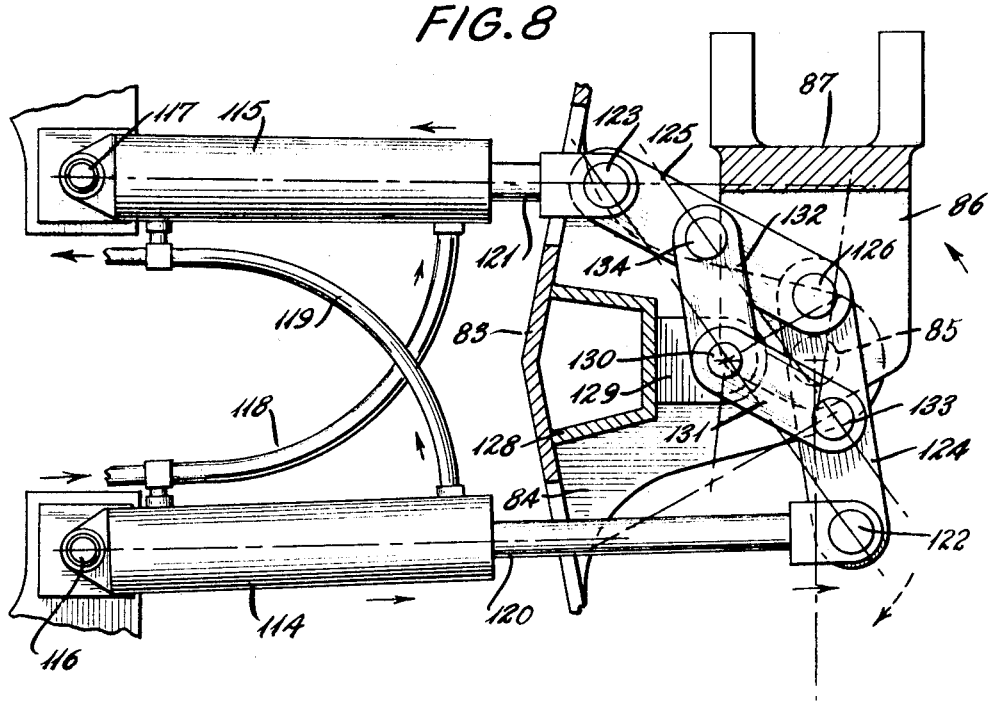
FIG. 8 is a section similar to FIG. 7 illustrating the backhoe unit in a section position substantially 90° to the first.

As illustrated in FIG. 8, when the piston rod 120 is extended, it will apply a rearward thrust through the link 124 to the pivot 126 mounted on the base member 87, and since the pivot 126 is out of alignment with the vertical plane of the pintles 85, the base member 87 will be caused to rotate about such pintles. Rotation of the base member 87 will apply a forward thrust against the link 125 and cause the piston rod 121 to be retracted within the cylinder 115. Since the link 124 is swingably connected to the connecting link 131, and the link 125 is swingably connected to the connecting link 132, rearward movement of the piston rod 121 will cause the link 124 to oscillate about the pin 133 while rotating the base member about the pintles 85. Simultaneously the link 125 will be oscillated about the pin 134 as it forces the piston rod 121 to be retracted within the cylinder 115.

Since the links 124 and 125 are connected by pivots at each end, the connecting links 131 and 132 are necessary for causing rotation of the base member 87. If the connecting links 131 and 132 were omitted, outward movement of the piston rod 120 would merely swing the link 124 about the pivot 126 without causing rotation of the base member 87 and would cause substantially no corresponding movement in the link 125 and the piston rod 121. Since the pivot 126 is rotating about the vertical plane of the pintles 85 and the distance between the pivot 126 and the pivot pins 133 and 134 remains constant, the connecting links 131 and 132 will swing about the pivot pin 130 so that the center of rotation of the links 124 and 125 will be shifted as the connecting links 131 and 132 are swung about the pivot 130.

Due to the fact that the links 124 and 125 are oscillating about shifting pivots, the piston rods 120 and 121 will remain substantially parallel with each other at all times. By using this structure a substantially straight rearward force of one of the cylinders 114 and 115 will be translated to a smooth rotary force for rotating the base member 87 about the pintles 85 and the rotary force of the base member will be translated into a straight retracting force for the piston rod of the other cylinder. After the backhoe has been moved in one direction and it is desired to move the same in the opposite direction, fluid under pressure is introduced into the cylinder with the retracted piston rod so that the retracted piston rod will be extended and will apply a straight pushing force which will be translated into a smooth rotary force for rotating the base member 87 about the pintles 85 in the opposite direction.

In order to control the fluid cylinders 94 and 102 on the backhoe as well as the fluid cylinders 114 and 115 for controlling the position of the backhoe, a selector valve 137 is mounted on the rear of the vehicle and is provided with operating levers 138 for controlling the flow of fluid to the various cylinders. In order for the operator to have access to the operating levers 138, it is only necessary for the operator to reverse the position of the swivel seat 15.

It is sometimes necessary and often desirable to support the rear of the vehicle while the backhoe or another of the implements is in use, and in order to do this a stabilizer arm 139 at each side of the vehicle is swingably connected at one end to the frame 13 and the opposite end of each of such stabilizer arms is provided with a stabilizer pad 140. Each of the stabilizer arms is adapted to be raised and lowered by a fluid cylinder 141 swingably connected at one end to the frame 13 and having a piston rod 142 swingably connected to the outer end of the stabilizer arm 139. Extension and retraction of the piston rod 142 will lower and raise the stabilizer arm 139 as required. In order to control the position of the stabilizer arms, a pair of foot pedals 143 are located on opposite sides of the selector valve 137 in a position to be engaged by the feet of the operator. Such foot pedals control valves for introducing fluid to and removing fluid from the cylinders 141.

Figure 9:
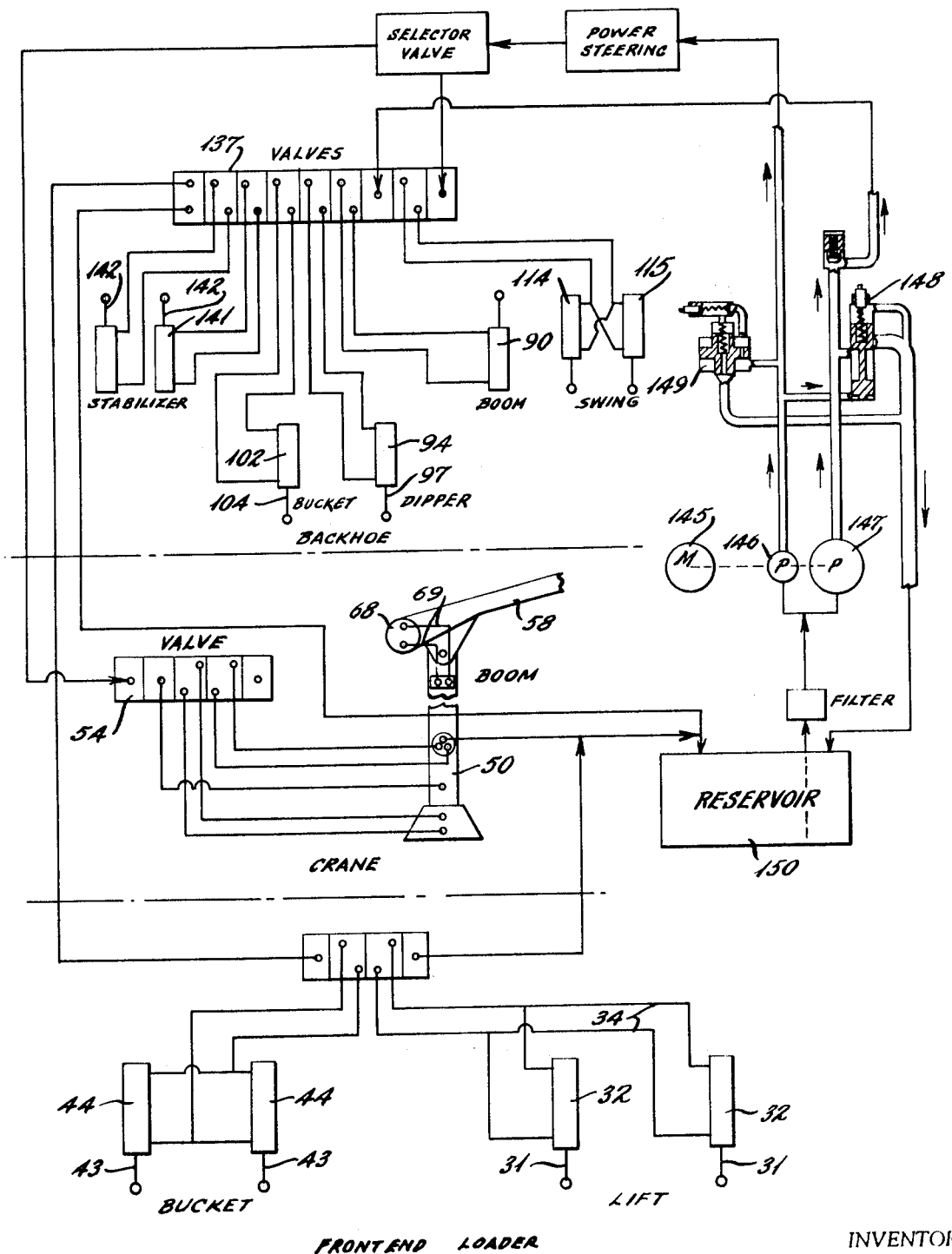
FIG. 9 is a schematic diagram of the hydraulic system of the vehicle.

With reference to FIG. 9, one of the major problems with any hydraulic system for operating multiple implements is the avoidance of excessive oil temperatures created primarily by restricting the oil flow through a small orifice in the swing circuit and by dumping excess oil through the relief valve when the maximum pressure of the system is reached. In order to avoid fluid overheating, the fluid system of the vehicle is provided with a motor 145 and a pair of constant delivery pumps 146 and 147 of different capacities with the pump 146 having a smaller capacity and higher pressure than the pump 147. This type of hydrauic system is conventional and is described and illustrated on pages 1605 and 1606 of "Tool Engineers' Handbook," published by McGraw-Hill Book Company, Inc., 1949 edition. When the work resistance is low, both pumps operate in parallel. When the work resistance rises to a value above the pressure setting of an unloading valve 148, the pressure from the high pressure pump 146 causes the unloading valve to open and return the discharge from the low pressure pump 147 to the tank at a minimum pressure. A high pressure relief valve 149 limits the maximum pressure within the system. After the discharge from the low pressure pump has been diverted to a reservoir 150, the high pressure pump 146 continues to build up until the relief valve 149 opens. When the high pressure relief valve opens, the flow of fluid from the small capacity pump 146 will be diverted through the relief valve and will generate heat; however, the amount of heat generated will not be significant since most of the fluid has already been returned to the reservoir by the unloading valve 148.

In the operation of the apparatus the front end loader normally requires mobility of the vehicle and accordingly while the front end loader is in use for loading, back filling, levelling or the like, the telescoping boom 58 and the backhoe 82 are retracted to inoperative positions while the work is being performed by the front end loader. It is noted that the front end loader can be easily interchanged with other implements such as fork lifts, jib cranes, or the like depending upon existing requirements.

When the central boom is to be operated to lift relatively light articles, the backhoe 82 and the loader 25 can be moved to inoperative positions. When the boom is to lift relatively heavy objects, the front end loader 25 can be operated until it rests on the earth and applies a downward force thereto to stabilize the front of the vehicle, and the stabilizer arms 139 can be lowered until the pads 140 are in engagement with the earth to stabilize the rear of the vehicle. This is particularly desirable when the boom is lifting a weight located at one side of the vehicle. The boom is capable of lifting up to 1300 pounds to a height of approximately 21 feet when fully extended and is capable of lifting a substantially heavier object when retracted. It should be clearly understood that the limitations of the weights being lifted depend upon the type of boom employed and it is contemplated that substantially heavier weights could be lifted by using heavy duty booms of various kinds.

When the backhoe 82 is to be used, the telescoping boom 58 normally is retracted and moved to inoperative position. However, since the vehicle will remain in fixed position during operation of the backhoe, the front end loader can be operated to apply a downward pressure to the earth and provide increased stability for the front of the vehicle, while the stabilizer arms 139 are moved downwardly until the pads 140 engage the earth and apply a downward pressure thereto to stabilize the rear of the vehicle. With the vehicle in this position the backhoe can be operated in a conventional manner by raising and lowering the backhoe boom 88 and the dip stick 93 and can be moved from side to side of the longitudinal axis of the vehicle by the fluid cylinders 114 and 115.

It will be obvious from the above that an extremely versatile vehicle has been provided having multiple implements which can be operated independently or which can be operated simultaneously with the only limitation being the capacity of the operator to operate multiple implements simultaneously.

What is claimed is:

1. A construction vehicle for excavating and moving earth and other materials as well as lifting objects from the earth comprising a frame supported by ground-engaging wheels and having a power plant for propelling the vehicle carried by said frame, a pair of generally parallel arms swingably mounted at one end to opposite sides of said frame, said arms extending forwardly of said frame, the forward ends of said arms being pivotally connected to a mounting member, a first implement carried by said mounting member, fluid means connected at one end to said frame and connected at the opposite end to each of said arms and adapted to raise and lower said arms, fluid means connecting said arms and said mounting member to control the position of said mounting member relative to said arms, a relatively large fluid cylinder mounted substantially centrally of the upper surface of said frame and disposed along a generally vertical axis, a boom carried by said relatively large fluid cylinder and with the longitudinal axis of the boom being at an angle to the vertical axis of said cylinder, cable means carried by said boom, said cable means adapted to be connected to an object to be lifted, means for raising and lowering said boom relative to said frame, means for rotating said boom from side to side of said vehicle, a backhoe swingably connected to the rear of said frame, said backhoe including a support member, a base member pivotally connected to said support member along a vertical axis to permit lateral swinging of said base member, a backhoe boom pivotally connected to said base member along a horizontal axis, fluid means for raising and lowering said boom, a dip stick pivotally connected to the outer end of said boom, fluid means for controlling the position of said dip stick relative to said boom, a backhoe bucket swingably mounted on the end of said dip stick remote from said boom, and fluid means for controlling the position of said backhoe bucket relative to said dip stick, said vehicle having a fluid system for operating said loader, boom and backhoe independently or simultaneously.

2. A construction vehicle having front, intermediate and rear implements comprising a frame disposed along the longitudinal axis of said vehicle, a pair of arms swingably mounted on opposite sides of said frame and extending forwardly thereof, an implement mounting frame pivotally carried by said arms in a position remote from said swingable mounting, an implement mounted on said mounting frame, fluid operated means for controlling the position of said mounting frame, fluid operated means for raising and lowering said arms and said implement, a relatively large fluid operated power means mounted on said frame intermediate the ends thereof, a boom swingably connected at one end to said power means and adapted to be raised and lowered thereby, means for rotating said boom from outboard of one side to outboard of the other side of said vehicle, means for raising and lowering the opposite end of said boom, a backhoe mounted on the rear of said frame, means for raising and lowering at least portions of said backhoe relative to the earth, means for swinging said backhoe from side to side of the longitudinal axis of said vehicle, adjustable fluid operated stabilizer means mounted at the rear of said frame, and a fluid pressure system for selectively operating said implement, boom, backhoe and stabilizer means independently or simultaneously.

3. The structure of claim 2, in which said implement mounted on said mounting frame includes a loader having a bucket extending across said mounting frame, whereby said bucket can receive material and the material can be discharged from the bucket at any position of said arms.

4. The structure of claim 2 in which said boom includes a winch operated cable means providing a connection to an object to be raised so that the object can be raised regardless of the elevational and rotational position of the boom.

5. The structure of claim 2 in which said boom is telescopic.

6. The structure of claim 2 in which said stabilizer means includes a pair of stabilizer arms mounted for swinging movement towards opposite sides of said frame, a stabilizer pad connected to the outer end of each of said stabilizer arms and adapted to engage the earth and stabilize the vehicle when the stabilizer means is operated.

References Cited

UNITED STATES PATENTS

| 1,917,053 | 7/1933 | Nelson et al. | 212—59 |
| 2,595,897 | 5/1952 | Shoemaker | 212—59 |
| 3,047,170 | 7/1962 | Hough et al. | 214—131 |
| 3,371,801 | 3/1968 | Widegren | 212—59 |

GERALD M. FORLENZA, Primary Examiner

J. M. FORSBERG, Assistant Examiner

U.S. Cl. X.R.

214—140; 212—34, 59